June 25, 1929.  W. A. ANGLEMYER  1,718,807
VALVE CONSTRUCTION
Filed May 28, 1927
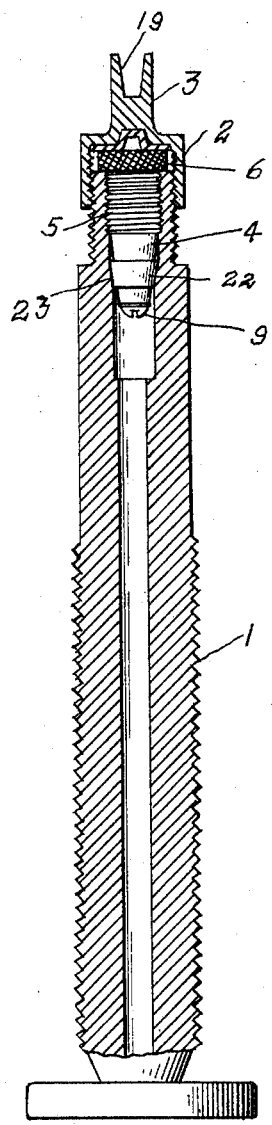
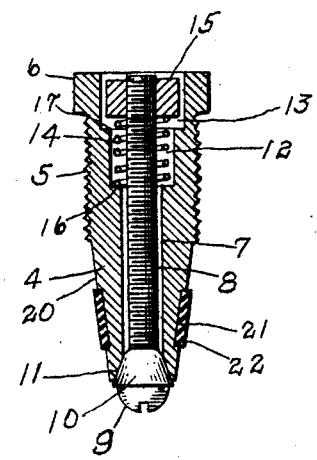
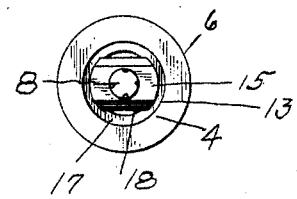
Inventor
WILLIARD A. ANGLEMYER
By Carey S. Frye
Attorney Patented June 25, 1929.

1,718,807

UNITED STATES PATENT OFFICE.

WILLIARD A. ANGLEMYER, OF INDIANAPOLIS, INDIANA.

VALVE CONSTRUCTION.

Application filed May 28, 1927. Serial No. 194,970.

This invention relates to valve constructions and is particularly adaptable for use in connection with air inflated objects, such as inner tubes for tires and the like, and one feature of the invention is the provision of a valve construction that may be easily and readily entered into the usual or any standard form of tube stem.

A further feature of the invention is the provision of a one piece housing or casing for the valve proper, which is constructed exteriorly with threads, whereby it may be screwed into the ordinary tube stem substantially its full length.

A further feature of the invention is the provision of a valve and stem therefor, the valve portion being of a shape that it will not stick to its seat and the stem terminating at its outer end substantially flush with the outer end of the housing, when the valve is drawn firmly against its seat.

A further feature of the invention is the provision of means for manually locking the valve against its seat, such locking means being entirely confined within said housing.

A further feature of the invention is the provision of means for normally retaining the manually operated means for locking the valve against its seat, from casual rotation on the valve stem.

Other objects and advantages will be hereinafter more fully set forth and pointed out in the accompanying specification.

In the accompanying drawing which is made a part of this application,

Figure 1 is an enlarged sectional view through a tube stem, showing the valve structure in side elevation.

Figure 2 is an enlarged sectional view through the valve structure.

Figure 3 is a top plan view thereof, and,

Figure 4 is a detail elevation of the locking means for the valve.

Referring to the drawings, 1 indicates a tube stem of the conventional construction and 2 indicates the usual form of cap for the outer end thereof, said cap having a split key 3 thereon for a purpose to be hereinafter set forth.

The greatest difficulty encountered in the use of valve structures of this class, is the leakage of air around the valve, owing to the fact that it is necessary to construct the valve for use in a very limited space, thereby necessitating the use of a structure of extremely limited bearing surface.

To overcome this objectionable feature and at the same time increase the bearing surface of the valve without increasing the space which it occupies within the tube stem, a casing or housing 4 is provided, the upper portion thereof having exterior threads 5, which engage with threads within the ends of the tube stem 1. The extreme outer end of the housing 4 is provided with a head 6, which is preferably knurled, so that the housing may be readily turned into the stem with the fingers, although a tool may be used, if desired, said head projecting over the threaded portion of the housing so that the inner face thereof will shoulder against the end of the stem, when the housing is properly entered in the tube stem.

The housing 4 is provided with a central bore 7, through which extends a valve stem 8, the stem being preferably threaded throughout its length and provided with a head 9 at its inner end. Surrounding the stem 8 and resting on the head 9, is a valve 10, preferably of rubber or similar composition and the valve is substantially pear-shaped in general outline and cooperates with a tapered valve seat 11 at the inner end of the bore 7.

The outer portion of the bore 7 is formed into a socket 12, while the extreme outer end of the bore is formed into a cavity 13, the socket 12 serving to receive a pressure spring 14, while the cavity 13 receives and houses a valve adjusting and locking nut 15, a shoulder 16 being formed at the juncture of the bore and socket and a shoulder 17 at the juncture of the socket and cavity, the member 14 resting on the former and the nut 15 against the latter, when the nut is turned to locking position.

As best shown in Figs. 3 and 4 of the drawing, the nut 15 is oblong so as to permit air to readily pass into or out of the bore 7, the ends of the nut projecting over the shoulder 17, so that when the nut is turned to adjust the movement of the valve relative to the seat, or lock the valve against its seat, the ends of the nut will engage the shoulder 17 and cause the valve stem to move lengthwise, through the rotation of the nut. The side faces 18 of the nut 15, are preferably tapered, as best shown in Fig. 4 of the drawing, so that the flared jaws 19 of the key 3 will readily and accurately engage therewith.

The outer face 20 of the inner end portion of the housing 4 is preferably tapered and is provided with a circumferential groove 21 in which is seated a sealing ring 22, said ring, when the housing is properly seated in the tube stem 1, pressing against a tapered seat 23, thus sealing the opening through the tube stem against the passage of air around the housing.

The valve 10 is normally held seal tight against its seat 11 by the air pressure in the tube or other object to which the valve is attached, but in the event the pressure within the tube is not sufficient to hold the valve against its seat with sufficient pressure to prevent leakage, or in the event a slight imperfection is in the valve, which would prevent its seating with sufficient snugness to prevent leakage, the nut 15 is turned until it engages the shoulder 17, when by giving the nut an additional turn or more, the valve will be drawn against its seat with sufficient force to form a perfect seal and prevent leakage between the valve and its seat.

The pressure of the spring 14 is such that the valve 10 will be held against its seat under normal conditions with sufficient force to prevent casual rotation thereof while the nut is being turned in either direction on the stem, the nut 15 also being held against casual rotation at all times and the valve against becoming casually unseated, when the nut is being turned down on the valve stem.

As the nut 15 is below the outer end of the housing 4, and as the end of the valve stem 8 is below or even with the end of the housing, when drawn outwardly to its full extent, there will be no projecting parts to interfere with the application of an air line fitting or the application of an air guage, nor will there be any parts to engage the cap 2, other than the end of the housing 4, consequently a firm union can always be made between the cap and end of the housing. The nut 15 is also preferably locked in engagement with the stem 8, by mutilating one or more of the threads at the outer end of the stem, after the nut has been placed thereon, consequently the nut can not become lost, or separated from the stem.

The present form of valve structure is in the form of an accessory, as it can be assembled and sold with the tube stem, or may be sold separately therefrom and entered into the tube stem at any time and is so constructed that it will accurately replace the commonly used air valve, when entered into the tube stem. It will also be seen that by providing this form of valve and the various sealing elements, it will be practically impossible for air to leak through or around the valve structure.

It will likewise be seen that by forming the valve substantially pear-shape, the possibility of the valve sticking to its seat will be very remote, as the curving contour of the valve will prevent its wedging, as in the case of a valve having a straight taper from end to end. It will likewise be seen that, by forming the lower extremity of the valve of a slightly larger diameter than the diameter of the outer end of its cooperating seat, a portion of the valve will overlap and bind against the end of the housing, when the valve is forced against its seat.

What I claim is:

In combination with an internal threaded tube stem, a valve having a housing formed with an external threaded portion and a tapered portion, a sealing ring connected to said tapered portion, said housing having a through bore terminating at its lower end in a straight tapered valve seat, a substantially pear-shaped flexible valve arranged to engage said seat, said valve having a threaded upwardly projecting stem extending through said bore to a point substantially even with the upper end of said housing, said housing having an enlarged socket forming a shoulder in the bottom thereof with said bore, the upper end of said housing being recessed to provide an enlarged cavity that forms a shoulder with said socket, a valve adjusting and locking nut threaded to said stem and arranged to lie wholly within said cavity, the shoulder portion of said cavity limiting the downward movement of said nut, and yieldable means within said socket for engaging said nut for normally holding said valve and nut against rotation.

In testimony whereof I hereto affix my signature.

WILLIARD A. ANGLEMYER.